United States Patent
Katagiri et al.

(10) Patent No.: US 9,564,171 B2
(45) Date of Patent: Feb. 7, 2017

(54) RECONSTRUCTIVE ERROR RECOVERY PROCEDURE (ERP) USING RESERVED BUFFER

(71) Applicant: International Business Machines Corporation, Armonk, NY (US)

(72) Inventors: Takashi Katagiri, Yokohama (JP); Pamela R. Nylander-Hill, Tucson, AZ (US); Keisuke Tanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/838,317

(22) Filed: Aug. 27, 2015

(65) Prior Publication Data
US 2015/0371676 A1    Dec. 24, 2015

Related U.S. Application Data

(63) Continuation of application No. 14/149,752, filed on Jan. 7, 2014, now Pat. No. 9,141,478.

(51) Int. Cl.
*H03M 13/00* (2006.01)
*G11B 20/18* (2006.01)
*G06F 11/10* (2006.01)

(52) U.S. Cl.
CPC ....... *G11B 20/1886* (2013.01); *G06F 11/1076* (2013.01); *G11B 20/1803* (2013.01); *G11B 20/1833* (2013.01); *G11B 2020/1853* (2013.01)

(58) Field of Classification Search
CPC .............. G06F 11/1076; G06F 11/1853; G11B 2020/1853; G11B 20/1833; G11B 20/1803; G11B 20/1886

(Continued)

(56) References Cited

U.S. PATENT DOCUMENTS

| 4,697,266 A | 9/1987 | Finley |
| 5,247,523 A | 9/1993 | Arai et al. |

(Continued)

FOREIGN PATENT DOCUMENTS

| CN | 101101790 A | 1/2008 |
| CN | 101611385 A | 12/2009 |

(Continued)

OTHER PUBLICATIONS

Non-Final Office Action from U.S. Appl. No. 14/720,703, dated Oct. 7, 2015.

(Continued)

*Primary Examiner* — David Ton
(74) *Attorney, Agent, or Firm* — Zilka-Kotab, PC

(57) ABSTRACT

In one embodiment, a tape drive includes a reserved data buffer and logic integrated with and/or executable by a processor. The logic is configured to read a data set from a medium and store a first portion of the data set to the reserved data buffer in response to a determination that the first portion of the data set is correctable using C2 error correction code (ECC). The logic is also configured to replace any stored row of a non-C2-correctable portion of the data set stored to the reserved data buffer with a corresponding row of the data set read from the medium in response to a determination that the stored row of the non-C2-correctable portion of the data set has an equal amount or more C1-correctable error therein than the corresponding row of the data set read from the medium.

20 Claims, 9 Drawing Sheets

(58) Field of Classification Search
USPC .......................................................... 714/755
See application file for complete search history.

(56) References Cited

U.S. PATENT DOCUMENTS

| | | | |
|---|---|---|---|
| 5,684,810 | A | 11/1997 | Nakamura et al. |
| 5,844,919 | A | 12/1998 | Glover et al. |
| 5,983,384 | A | 11/1999 | Ross |
| 6,624,958 | B1 | 9/2003 | Alva |
| 6,640,326 | B1 | 10/2003 | Buckingham et al. |
| 6,738,942 | B1 | 5/2004 | Sridharan et al. |
| 6,751,771 | B2 | 6/2004 | Chuang et al. |
| 6,757,848 | B2 | 6/2004 | Bartlett |
| 6,779,149 | B1 | 8/2004 | Dong |
| 6,862,149 | B2 | 3/2005 | Maple et al. |
| 6,920,005 | B2 | 7/2005 | Yun |
| 6,958,873 | B2 | 10/2005 | Sved |
| 7,188,299 | B2 | 3/2007 | Nakagawa et al. |
| 7,280,293 | B2 | 10/2007 | Nylander-Hill et al. |
| 7,624,328 | B2 | 11/2009 | Unruh |
| 7,840,872 | B2 | 11/2010 | Andersen |
| 7,965,462 | B2 | 6/2011 | Demura et al. |
| 7,987,404 | B2 | 7/2011 | Fukuda et al. |
| 8,108,752 | B2 | 1/2012 | Tanaka |
| 8,209,693 | B2 | 6/2012 | Matsuo |
| 8,793,552 | B2 | 7/2014 | Katagiri et al. |
| 8,810,944 | B1 | 8/2014 | Katagiri et al. |
| 9,053,748 | B2 | 6/2015 | Katagiri et al. |
| 9,104,576 | B2 | 8/2015 | Katagiri et al. |
| 9,141,478 | B2 | 9/2015 | Katagiri et al. |
| 2001/0037484 | A1 | 11/2001 | Paterson |
| 2002/0143985 | A1 | 10/2002 | Goldstein |
| 2002/0181356 | A1 | 12/2002 | Watanabe et al. |
| 2002/0194544 | A1* | 12/2002 | Bartlett ................... G11B 20/18 714/42 |
| 2003/0066013 | A1* | 4/2003 | Maple ................ G11B 20/1833 714/771 |
| 2004/0205442 | A1 | 10/2004 | Chuang et al. |
| 2005/0149819 | A1 | 7/2005 | Hwang |
| 2005/0207305 | A1 | 9/2005 | Park |
| 2008/0098280 | A1 | 4/2008 | Andersen |
| 2008/0155374 | A1* | 6/2008 | Tanaka ................ G11B 20/1833 714/755 |
| 2008/0222490 | A1 | 9/2008 | Leung et al. |
| 2008/0235556 | A1 | 9/2008 | Eleftheriou et al. |
| 2008/0320361 | A1 | 12/2008 | Fukuda et al. |
| 2009/0287956 | A1 | 11/2009 | Flynn et al. |
| 2010/0162083 | A1 | 6/2010 | Chung et al. |
| 2012/0002317 | A1 | 1/2012 | Hirata et al. |
| 2012/0206831 | A1 | 8/2012 | Katagiri et al. |
| 2013/0086422 | A1 | 4/2013 | Huang et al. |
| 2014/0136918 | A1 | 5/2014 | Katagiri et al. |
| 2014/0136919 | A1 | 5/2014 | Katagiri et al. |
| 2014/0189460 | A1 | 7/2014 | Katagiri et al. |
| 2015/0026510 | A1 | 1/2015 | Katagiri et al. |
| 2015/0193303 | A1 | 7/2015 | Katagiri et al. |
| 2015/0193304 | A1 | 7/2015 | Katagiri et al. |
| 2015/0256205 | A1 | 9/2015 | Katagiri et al. |
| 2015/0302888 | A1 | 10/2015 | Katagiri et al. |

FOREIGN PATENT DOCUMENTS

| | | |
|---|---|---|
| DE | 102007046789 A1 | 4/2008 |
| EP | 1758023 A2 | 2/2007 |
| EP | 2199911 A1 | 6/2010 |
| WO | 2008109586 A1 | 9/2008 |

OTHER PUBLICATIONS

Non-Final Office Action from U.S. Appl. No. 14/752,923, dated Oct. 29, 2015.
Non-Final Office Action from U.S. Appl. No. 14/149,758, dated Nov. 10, 2015.
Non-Final Office Action from U.S. Appl. No. 14/199,911, dated Feb. 1, 2016.
Office Action from German Application No. 112013005453.1, dated Jan. 14, 2016.
Examination Report from United Kingdom Application No. GB1509708.2, dated Feb. 9, 2016.
Final Office Action from U.S. Appl. No. 14/285,271, dated Jan. 30, 2015.
Notice of Allowance from U.S. Appl. No. 13/676,477, dated Feb. 2, 2015.
Notice of Allowance from U.S. Appl. No. 14/285,271, dated Apr. 7, 2015.
Notice of Allowance from U.S. Appl. No. 14/149,752, dated May 20, 2015.
Final Office Action from U.S. Appl. No. 13/676,477 dated Jul. 18, 2014.
International Search Report and Written Opinion from PCT Application No. PCT/CN2013/084934 dated Jan. 16, 2014.
Non-Final Office Action from U.S. Appl. No. 13/676,477 dated Dec. 24, 2013.
Non-Final Office Action from U.S. Appl. No. 14/285,271, dated Jul. 21, 2014.
Notice of Allowance from U.S. Appl. No. 13/676,477, dated Oct. 29, 2014.
Notice of Allowance from U.S. Appl. No. 13/676,493, dated Jan. 10, 2014.
Notice of Allowance from U.S. Appl. No. 13/943,674, dated Feb. 19, 2014.
Notice of Allowance from U.S. Appl. No. 13/676,493, dated Mar. 14, 2014.
Notice of Allowance from U.S. Appl. No. 13/943,674, dated Apr. 4, 2014.
Katagiri et al., UU.S. Appl. No. 13/676,477, filed Nov. 14, 2012.
Katagiri et al., U.S. Appl. No. 13/676,493, filed Nov. 14, 2012.
Katagiri et al., U.S. Appl. No. 13/943,674, filed Jul. 16, 2013.
Katagiri et al., U.S. Appl. No. 14/149,752, filed Jan. 7, 2014.
Katagiri et al., U.S. Appl. No. 14/149,758, filed Jan. 7, 2014.
Katagiri et al., U.S. Appl. No. 14/199,911, filed Mar. 6, 2014.
Katagiri et al., U.S. Appl. No. 14/285,271, filed May 22, 2014.
Corrected Notice of Allowability from U.S. Appl. No. 14/285,271, dated May 20, 2015.
Katagiri et al., U.S. Appl. No. 14/720,703, filed May 22, 2015.
Katagiri et al., U.S. Appl. No. 14/752,923, filed Jun. 27, 2015.
Corrected Notice of Allowability from U.S. Appl. No. 14/149,752, dated Jul. 9, 2015.
Examination Report from United Kingdom Application No. GB1509708.2, dated Jul. 14, 2015.
Corrected Notice of Allowability from U.S. Appl. No. 14/149,752, dated Aug. 3, 2015.
Final Office Action from U.S. Appl. No. 14/752,923, dated May 5, 2016.
Final Office Action from U.S. Appl. No. 14/720,703, dated Jun. 8, 2016.
Notice of Allowance from U.S. Appl. No. 14/752,923, Jul. 13, 2016.
Notice of Allowance from U.S. Appl. No. 14/720,703, dated Aug. 31, 2016.
Notice of Allowance from U.S. Appl. No. 14/149,758, dated Sep. 9, 2016.
Non-Final Office Action from U.S. Appl. No. 14/199,911, dated Sep. 16, 2016.
Notice of Allowance from U.S. Appl. No. 14/752,923, dated Oct. 13, 2016.
Notice of Allowance from U.S. Appl. No. 14/149,758, dated Oct. 17, 2016.
Notice of Allowance from U.S. Appl. No. 14/720,703, dated Oct. 25, 2016.

* cited by examiner

RECONSTRUCTIVE ERROR RECOVERY PROCEDURE (ERP) USING RESERVED BUFFER

BACKGROUND

The present invention relates to data storage, and more particularly, to reading data from tape using a reconstructive error recovery procedure (ERP) to reduce backhitches during error burst scenarios.

Tape and optical storage devices use very powerful error correction codes, such as product codes or concatenated codes, in conjunction with interleaving to provide a very high degree of data integrity. These error correction schemes typically use two error correction codes (ECCs) as component codes. Two important burst-error performance measures for tape storage systems protected by these schemes are: 1) lateral width of an erroneous stripe which is still capable of being corrected (this is also known as "broken track correction" capability), and 2) longitudinal width of an erroneous stripe that is still capable of being corrected. A "broken" track generally refers to a track that cannot be read correctly due to a problem on the media itself and/or a problem with the readback channel, e.g., as a channel that does not detect data correctly because of alignment or some systematic problem with the head.

When a tape drive reads data from a tape, or when a tape drive writes data to a tape, a unit of data that is read or written is referred to as a "data set." The data set is encoded using interleaved sets of codewords that are organized into an ECC-encoded matrix of size M bytes×N bytes (M×N) and then written to tape as shown in FIG. 1, according to the prior art. There are two levels of encoding within this matrix 150. The first level of encoding utilizes the matrix rows 102. Each row 102 of the matrix contains C1-ECC row parity 106, which adds p-bytes of C1-ECC to the n-bytes of user data (e.g., N=n+p bytes). The second level of encoding, C2-ECC column parity 108, adds q-bytes of C2-ECC to each matrix column 104. For example, if q=12, then adding 12 bytes of C2-ECC would add 12 rows to the matrix 150 (e.g., M=m+q bytes).

When the data set is read from the tape in a high error rate condition, C1/C2 ECC is not capable of correcting the read data. For example, in some approaches, C1-encoding is capable of correcting 10 bytes of error, and C2-encoding is capable of correcting 20 bytes of error. If the error bytes exceed this correction power, then data cannot be read from the tape. In this scenario, the tape drive will then attempt ERP to read the data set from the tape again with a different hardware setting (e.g., changing the tape speed). ERP repeats until C1/C2-encoding is able to correct the data or until the ERP retry count exceeds a threshold. If the retry count exceeds the threshold, then the tape drive will report a permanent error for the read operation.

There are several problems with this conventional approach. First, if the error rate is consistently high, C1 and C2 cannot correct the data and the tape drive fails to read the data set, which is extremely undesirable. Second, in areas of tape where the error rate is high due to media damage, marginal writing, data written in older formats, etc., the drive may fail to read. Third, extended recovery involves multiple backhitches necessary to reread data from the tape which degrades host performance and can also further damage media.

Accordingly, it would be beneficial to have a data recovery procedure that increases the efficiency of reading stored data from the tape.

BRIEF SUMMARY

In one embodiment, a tape drive includes a reserved data buffer and logic integrated with and/or executable by a processor. The logic is configured to read a portion of a data set from a medium, the portion of the data set having a plurality of rows which form an array. The logic is also configured to store the portion of the data set to the reserved data buffer in response to a determination that the portion of the data set is correctable using C2 error correction code (ECC). Moreover, the logic is configured to replace any stored row of a non-C2-correctable portion of the data set stored to the reserved data buffer with a corresponding row of a portion of the data set read from the medium in response to a determination that the stored row of the non-C2-correctable portion of the data set has an equal amount or more C1-correctable error therein than the corresponding row of the portion of the data set read from the medium. In addition, the logic is configured to replace any stored row of the non-C2-correctable portion of the data set stored to the reserved data buffer with a corresponding C1-correctable row read from the medium in response to a determination that the corresponding C1-correctable row read from the medium has fewer corrected errors therein than the stored row of the non-C2-correctable portion of the data set stored to the reserved data buffer.

In another embodiment, a method for reading data from a medium includes reading a portion of a data set from a medium, the portion of the data set having a plurality of rows which form an array. The method includes storing the portion of the data set to a reserved data buffer in response to a determination that the portion of the data set is correctable using C2 ECC. Also, the method includes replacing any stored row of a non-C2-correctable portion of the data set stored to the reserved data buffer with a corresponding row of a portion of the data set read from the medium in response to a determination that the stored row of the non-C2-correctable portion of the data set has an equal amount or more C1-correctable error therein than the corresponding row of the portion of the data set read from the medium. Moreover, the method includes replacing any stored row of the non-C2-correctable portion of the data set stored to the reserved data buffer with a corresponding C1-correctable row read from the medium in response to a determination that the corresponding C1-correctable row read from the medium has fewer corrected errors therein than the stored row of the non-C2-correctable portion of the data set stored to the reserved data buffer.

According to another embodiment, a tape drive includes a reserved data buffer and logic integrated with and/or executable by a processor. The logic is configured to read a data set from a medium and store a first portion of the data set to the reserved data buffer in response to a determination that the first portion of the data set is correctable using C2 ECC. The logic is also configured to replace any stored row of a non-C2-correctable portion of the data set stored to the reserved data buffer with a corresponding row of the data set read from the medium in response to a determination that the stored row of the non-C2-correctable portion of the data set has an equal amount or more C1-correctable error therein than the corresponding row of the data set read from the medium.

Other aspects and embodiments of the present invention will become apparent from the following detailed descrip-

DETAILED DESCRIPTION

Figure 1:
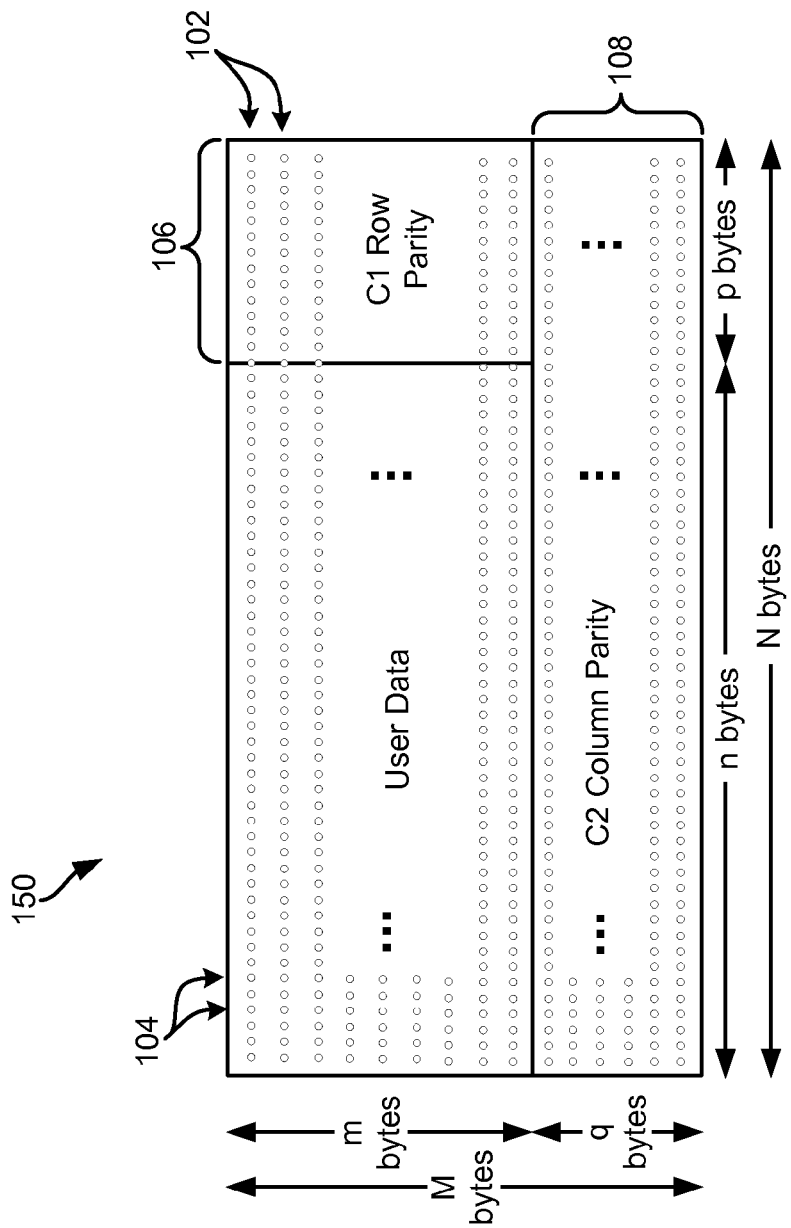
FIG. 1 shows a data set matrix, according to the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In one general embodiment, a tape drive includes a data buffer having a reserved data buffer and logic integrated with and/or executable by a processor, the logic being configured to: read a sub data set from a medium, the sub data set being a part of a data set which includes a plurality of sub data sets, the sub data set including a plurality of rows which form an array, store a C2-correctable sub data set read from the medium to the reserved data buffer when the sub data set read from the medium is correctable using C2 error correction code (ECC), compare all rows of a non-C2-correctable sub data set stored to the reserved data buffer to corresponding rows of the sub data set read from the medium when the sub data set read from the medium is non-C2 correctable, replace any stored row of the non-C2-correctable sub data set stored to the reserved data buffer with a corresponding row of the sub data set read from the medium when the stored row of the non-C2-correctable sub data set has an equal amount or more C1-correctable error therein than the corresponding row of the sub data set read from the medium, replace any stored row of the non-C2-correctable sub data set stored to the reserved data buffer with a corresponding C1-correctable row read from the medium when it has fewer corrected errors therein than the stored row of the non-C2-correctable sub data set stored to the reserved data buffer, aggregate the stored rows of the data set in the reserved data buffer to form a sub data set stored to the reserved data buffer, determine whether C2-ECC is capable of correcting all errors in the sub data set stored to the reserved data buffer and ensuring that no portion of the C2-correctable sub data set stored to the reserved data buffer is overwritten during subsequent reading of the data set, and reread the sub data set from the medium using a different setting in an error recovery procedure (ERP) when an error in the sub data set stored to the reserved data buffer is not correctable using C2-ECC.

In another general embodiment, a method for reading data from a medium includes reading a sub data set from a medium, the sub data set being a part of a data set which includes a plurality of sub data sets, each sub data set including a plurality of rows which form an array, storing a C2-correctable sub data set read from the medium to the reserved data buffer when the sub data set read from the medium is correctable using C2-ECC, comparing all rows of a non-C2-correctable sub data set stored to the reserved data buffer to corresponding rows of the sub data set read from the medium when the sub data set read from the medium is non-C2 correctable, replacing any stored row of the non-C2-correctable sub data set stored to the reserved data buffer with a corresponding row of the sub data set read from the medium when the stored row of the non-C2-correctable sub data set has an equal amount or more C1-correctable error therein than the corresponding row of the sub data set read from the medium, replacing any stored row of the non-C2-correctable sub data set stored to the reserved data buffer with a corresponding C1-correctable row read from the medium when it has fewer C1-correctable errors therein than the stored row of the non-C2-correctable sub data set stored to the reserved data buffer, aggregating the stored rows of the data set in the reserved data buffer to form a sub data set stored to the reserved data buffer, determining whether C2-ECC is capable of correcting all errors in the sub data set stored to the reserved data buffer and ensuring that no portion of the C2-correctable sub data set stored to the reserved data buffer is overwritten during subsequent reading of the data set, and rereading the sub data set from the medium using a different setting in an ERP when an error in the sub data set stored to the reserved data buffer is not correctable using C2-ECC.

According to another general embodiment, a method for reading data from a medium includes reading a data set from a medium repeatedly using different settings until either: a reconstructed data set is obtained, or a maximum number of rereads has been reached, wherein the data set includes a plurality of sub data sets, each sub data set including a plurality of rows, after each reading of at least a portion of the data set: storing each C2-correctable sub data set read from the medium to a reserved data buffer when the sub data set read from the medium is correctable using C2-ECC and ensuring that no portion of the C2-correctable sub data set stored to the reserved data buffer is overwritten during subsequent reading of the data set, storing each row of a non-C2-correctable sub data set read from the medium to a reserved data buffer when a corresponding row of the sub data set stored to the reserved data buffer is non-C2-correctable and has an equal amount or more C1-correctable error therein than the corresponding row of the sub data set read from the medium, and storing each row to the reserved data buffer that has no errors or errors in the row are correctable using C1-ECC unless a matching row already exists in the reserved data buffer that has fewer C1-correctable errors therein, assembling each sub data set when all rows thereof are stored in the reserved data buffer, correcting any remaining errors in each sub data set using C2-ECC and after all sub data sets have been assembled, assembling the data set from the sub data sets stored in the reserved data buffer to obtain the reconstructed data set.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Moreover, a system according to various embodiments may include a processor and logic integrated with and/or executable by the processor, the logic being configured to perform one or more of the process steps recited herein.

Figure 2A:
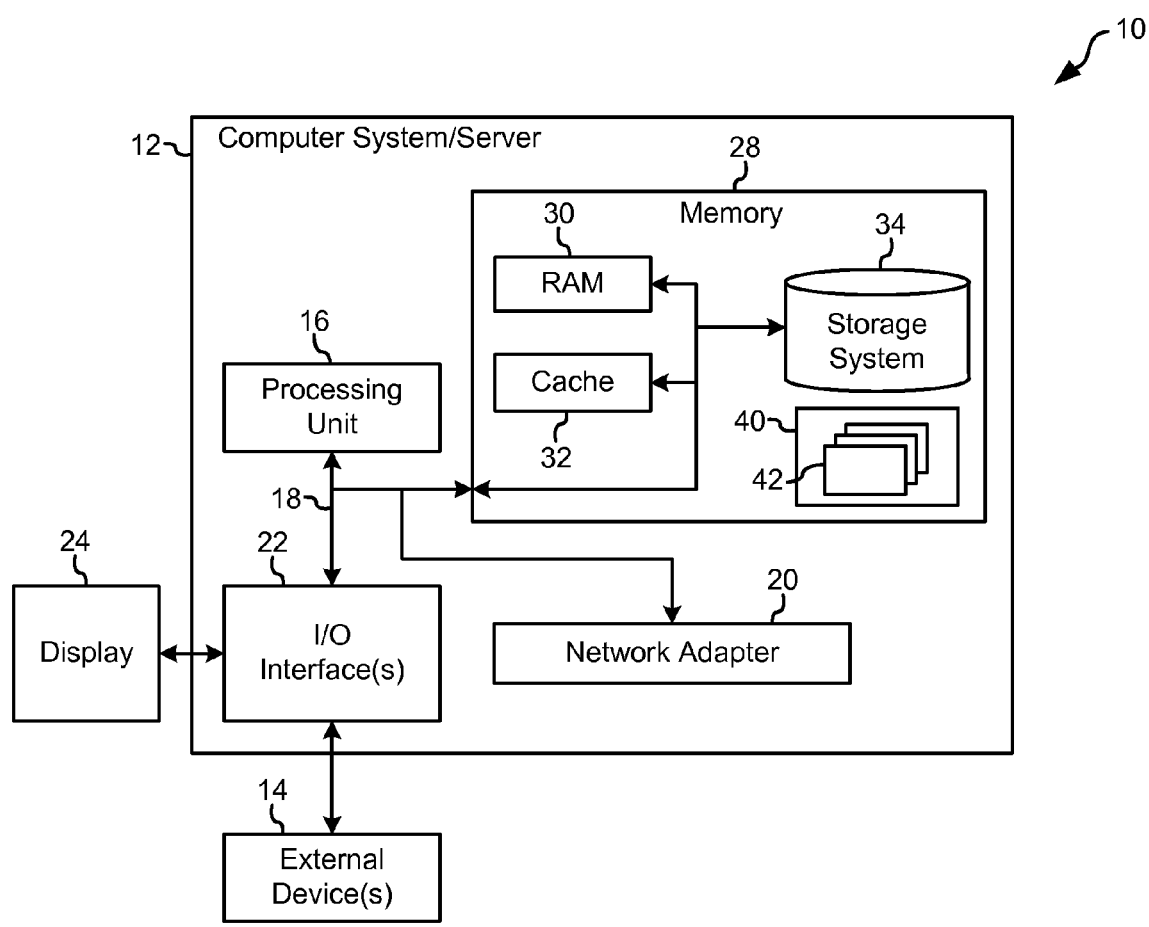
FIG. 2A illustrates a network storage system, according to one embodiment.

Referring now to FIG. 2A, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2A, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2B:
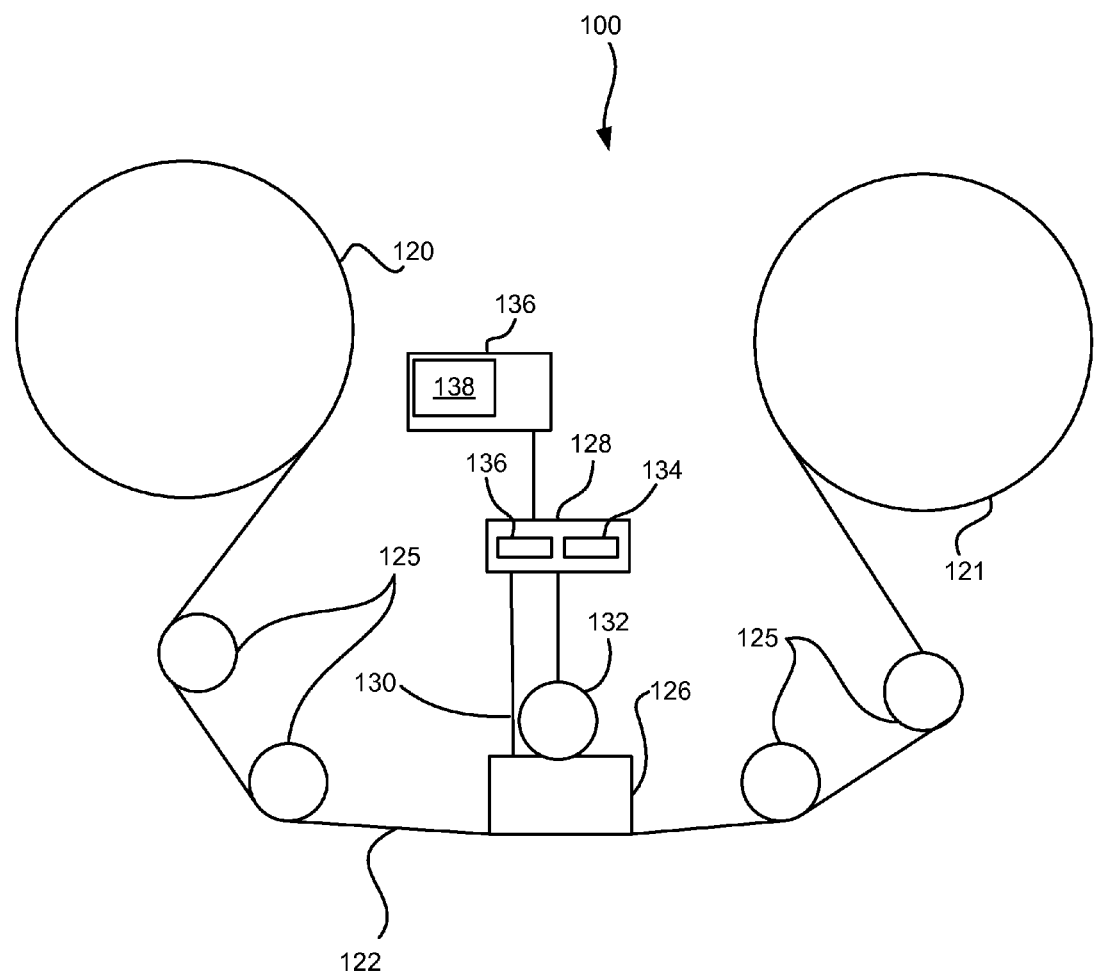
FIG. 2B illustrates a simplified tape drive of a tape-based data storage system, according to one embodiment.

FIG. 2B illustrates a simplified tape drive 100 of a tape-based data storage system, which may be employed according to various embodiments. While one specific implementation of a tape drive is shown in FIG. 2B, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 2B, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically comprises a servo channel 134 and data channel 136 which includes data flow processing. It controls reel motion (not shown in FIG. 2B) and head functions, such as track following, writing, reading, etc. The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

In one embodiment, the tape drive 100 may comprise a data buffer 136 which is accessible by the tape drive 100 and the controller 128. This data buffer 136 may be split into one or more sections, with one section being a reserved data buffer 138 to be used for storage of partial data sets during reading operations from the tape 122.

An interface may also be provided for communication between the tape drive 100 and a host (integral or external) to send and receive the data and for controlling the operation of the tape drive 100 and communicating the status of the tape drive 100 to the host, as would be understood by one of skill in the art.

Various types of error correction code (ECC) schemes are used in data storage to achieve very low bit error rates, e.g., magnetic tape and optical storage products are designed to ensure bit error rates in the range of $1 \times 10^{-17}$ to $1 \times 10^{-19}$ under normal operating conditions. Linear block codes, such as Reed-Solomon (RS) codes and low-density parity-check (LDPC) codes, have generally been preferred ECC schemes used in data storage products.

According to one embodiment, a reconstructive data recovery method uses a reserved data buffer portion of a tape drive's data buffer to store data from repeated data set read recovery attempts. The encoded data is reconstructed iteratively as error recovery procedure (ERP) repeats data set re-read from a tape to the reserved data buffer.

After each read of data from the tape, it may be determined which rows, each row including C1-encoded data, are satisfactory (referred to as good C1 rows) and which are not. This determination may be based on whether the C1 row has no errors or if the errors are correctable using C1-ECC. In the first read, all rows are stored to the reserved data buffer regardless of the quality of the read. However, in each subsequent read of the data from the tape, those C1 rows which are better than a C1 row already stored to the reserved data buffer is written to the reserved data buffer in order to replace the C1 row currently stored thereto. Furthermore, any time a C1 row is stored to the reserved data buffer and is not C1 correctable (e.g., a C1 row which was stored in the first read), it is replaced by a subsequently read C1 row regardless of whether the subsequently read C1 row has less correctable errors therein. In one embodiment, the C1 rows may be stored to the reserved data buffer after an ERP retry step has completed (e.g., one reread of data from the tape).

According to one scenario, when the error occurs randomly between each of the ERP retry steps, then different C1 rows will be uncorrectable in each ERP reread. Accordingly, by aggregating good C1 rows in the reserved data buffer, a complete data read with good C1 rows will be assembled in the reserved data buffer through repeated ERP retry steps. In contrast, with conventional methods, each reread would be analyzed separately, and regardless of the good C1 rows that are present, when a sufficient number of bad C1 rows are read, the entire data set will be deemed to be uncorrectable and another ERP retry step will be performed. Furthermore, because the error is assumed to be random, when a set of C1 rows is analyzed to determine whether the entire set of C1 rows can be C2 corrected, and it is determined that it cannot, new C1 rows are stored to the reserved data buffer not only to replace C1 rows with better C1 rows, but also to replace any stored C1 row which is not C1 correctable with a different C1 row in an attempt to allow the entire set of C1 rows to now be C2 correctable.

With the present method, each reread can accumulate good C1 rows in the reserved data buffer along with other C1 rows to replace those which were not C1 correctable previously, and when C2-ECC is subsequently able to correct the data, then the error is recovered, the ERP retry steps will cease, and the entire reconstructed data set will be copied from the reserved data buffer and sent to the host.

By utilizing the methods described herein according to various embodiments to read data from a tape, it is possible to recover errors even though there is no hardware setting that is capable of reading the data from the tape in a recoverable state in a single retry. This is because the methods described herein use multiple retry steps and store recoverable data from each reread in the reserved data buffer in order to assemble an entire data set which may then be recoverable. For example, if a first hardware setting is effective to read the data for a first half of the data set, and a second hardware setting is effective to read the data for a second half of the data set, the methods described herein are capable of recovering the error using two retries that apply these two different hardware settings, whereas a conventional method would not be able to read the data in these two retries. This is because, according to current methods, at least a third hardware setting, or even more hardware settings in some instances, would be required to read the data for the entire data set. When there is no single hardware setting capable of reading the entire data set, then with conventional methods, the data set would not be capable of being read.

Therefore, by using the methods described herein according to various embodiments, the elapsed time used for ERP is reduced, since good C1 rows are assessed after each reread with different hardware settings (an ERP retry), are accumulated in the reserved data buffer, and then assembled to reconstruct the entire data set. In this fashion, the number of repeated ERP retries may all contribute to recovering the error and lead to quicker read data recovery.

Data sets are written on tape, and each data set has a number (data set number) which is assigned to it sequentially from the beginning of the tape. For example, when the tape drive attempts to read data set #N (DS#N), DS#N can either be read without errors, be read with errors that are correctable with C1/C2-ECC, or cannot be read due to high error count (e.g., C1/C2-ECC cannot correct the errors). Even if all data cannot be recovered by C1/C2-ECC, some good C1 rows may still be read from the tape, and these good C1 rows may be stored from the tape to the reserved data buffer on the tape drive. Following the first read retry from tape, all C1 rows may be stored to the reserved data buffer, in one approach.

Each C1 row has the information which identifies the data set number from which the C1 row was read (which data set the C1 row belongs to), and the tape drive may use this to check the validity of the C1 row (DS#N or not). If the C1 row is for DS#N, then the syndrome of the C1 row may be checked in another approach, and this syndrome may indicate whether or not the error is recoverable via C1-ECC correcting power. After so verified, the tape drive copies this C1 row to the reserved data buffer area. When the next ERP also attempts to read DS#N from the tape, the validity check of C1 row and the data set number are already completed, which saves time. If there are new good C1 rows, these new good C1 rows are also copied (aggregated) in the reserved data buffer. If a sufficient number of C1 rows are so aggregated, the drive then attempts to correct the data via C2-ECC. If C2-ECC is able to correct all the error in the aggregated C1 rows, this indicates that the tape drive has successfully reconstructed an entire data set and the tape drive may then transfer this data set to the host.

Figure 3:
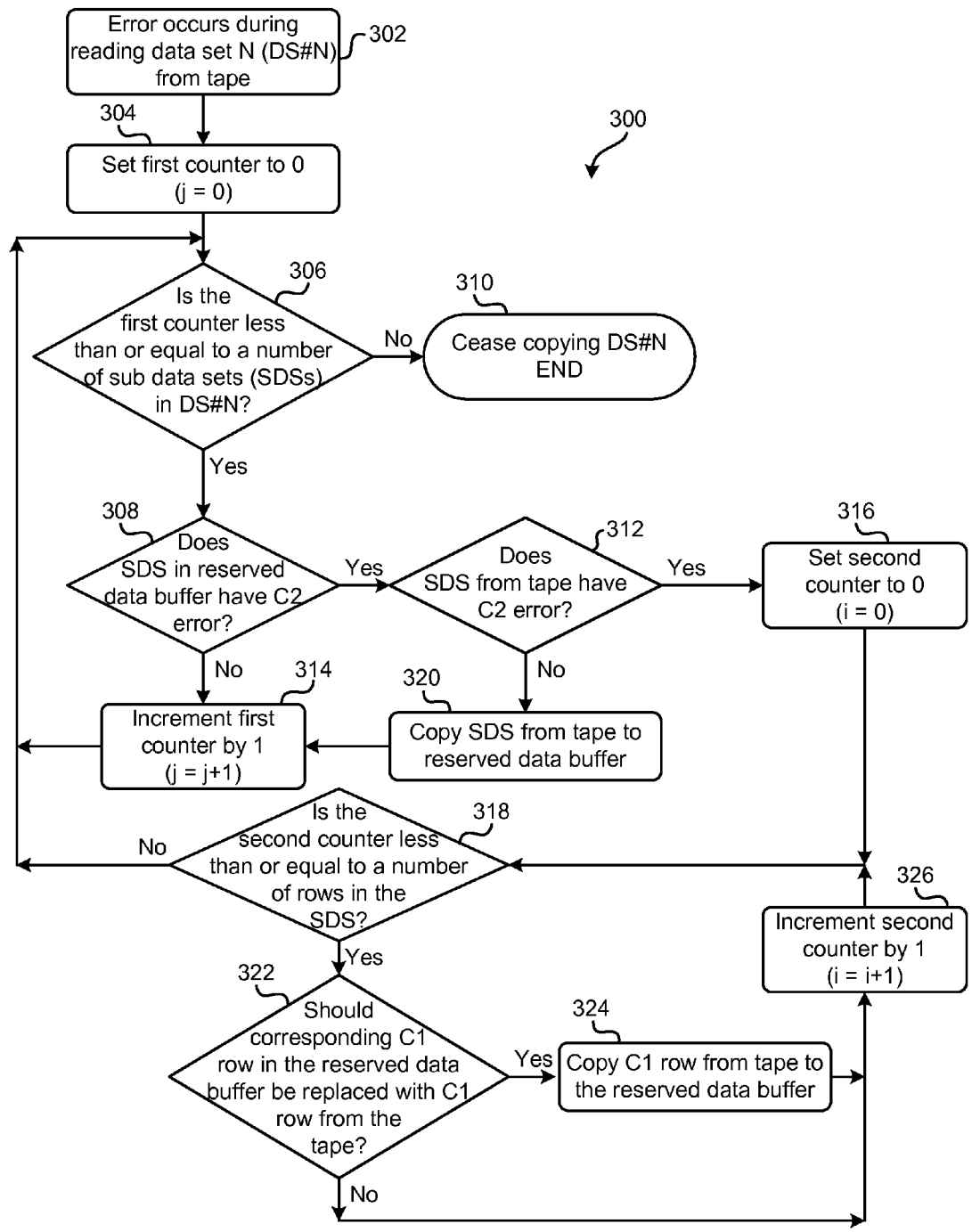
FIG. 3 shows a method for reading data from a medium using a reconstructive error recovery procedure (ERP), according to one embodiment.

Now referring to FIG. 3, a method 300 for data set reconstructive ERP is shown according to one embodiment. The method 300 may be performed in accordance with the present invention in any of the environments depicted in FIGS. 1-2B, among others, in various embodiments. Of course, more or less operations than those specifically described in FIG. 3 may be included in method 300, as would be understood by one of skill in the art upon reading the present descriptions.

In operation 302, an error occurs during reading of a data set from a magnetic tape. The data set is indicated as DS#N, meaning that it may be any data set on the magnetic tape. For each subsequent reread, the same data set (DS#N) is read from the magnetic tape, but it is read using different settings. DS#N may be at a beginning of the magnetic tape, somewhere in the middle, or at an end of the magnetic tape. The data set will be reread until a maximum allowable number of data set reads ($ERP_{max}$) is reached or the data set is reconstructed correctly, whichever occurs first.

In operation 304, a first counter (represented by j) is set to zero (j=0). This first counter may be used to count a number of rereads of the data set (DS#N) from the magnetic tape.

In operation 306, it is determined whether the first counter is less than or equal to a number of sub data sets (SDSs) in the data set (DS#M). When the first counter has not reached the number of SDSs in DS#N, method 300 continues to operation 308; otherwise, when all of the SDSs have been copied, method 300 ceases in operation 310.

In operation 308, it is determined whether the SDS in the reserved data buffer has C2 error. When there is C2 error therein, method 300 continues on to operation 312; otherwise, when the SDS stored to the reserved data buffer does not have C2 error therein, method 300 continues to operation 314.

In operation 312, it is determined whether the SDS from the magnetic tape has C2 error therein. When the SDS does have C2 error therein, method 300 continues to operation 316; otherwise, method 300 continues to operation 320.

In operation 320, the SDS from the magnetic tape is copied to the reserved data buffer. Then, method 300 continues to operation 314.

When the SDS in the reserved data buffer has C2 error or the SDS from the magnetic tape is copied to the reserved data buffer, in operation 314, the first counter is incremented by 1, e.g., j=j+1. Then, method 300 returns to operation 306.

In operation 316, a second counter is set to zero, e.g., i=0. The second counter is used to keep track of how many C1 rows from the SDS have been read. Then, method 300 continues on to operation 318 where it is determined whether the second counter is less than or equal to a number of rows in the SDS. When the second counter is at most equal to the number of rows in the SDS, method 300 continues to operation 322; otherwise, method 300 returns to operation 306.

In operation 322, it is determined whether a corresponding C1 row in the reserved data buffer should be overwritten with the C1 row from the SDS from the magnetic tape. Any known method of determining whether to replace the stored C1 row may be used as known in the art. In one embodiment, the stored C1 row may be replaced when the C1 row from the magnetic tape has less C1 correctable errors therein. When it is determined to replace the stored C1 row, method 300 continues to operation 326; otherwise, it continues to operation 324.

In operation 324, the C1 row from the magnetic tape is copied to the reserved data buffer, and method 300 continues to operation 326, where the second counter is incremented by one, e.g., i=i+1.

Then, method 300 returns to operation 318 to again check whether all rows have been processed.

According to method 300, less rereads of the data set may be required in order to produce a data set with correctable error because it is not necessary to correctly read the entire data set in a single reread. Instead, select rows of the data set having fewer errors will be aggregated across multiple retries into a reserved data buffer, while it will be checked repetitively whether C2 error correction is capable of overcoming any remaining error after C1 error correction.

In some reconstructive ERP methods, the C1 row is not stored in the reserved data buffer when the C1 error in the C1 row read from the magnetic tape is not correctable. However, if the error type is random, some parts of the C1 row may have good parts (bytes) for C2 error correction. Therefore, in one approach, the C1 row may be copied to the reserved data buffer when the C1 row already stored in the reserved data buffer also has C1 error. In some further approaches, the stored C1 row may only be replaced when the C1 row read from the magnetic tape has less C1 error therein and/or at most the same amount of C1 error. In other approaches, the C1 row read from the magnetic tape may replace the stored C1 row regardless of the amount of error therein when each of the two rows has C1 error therein.

Figure 4A:
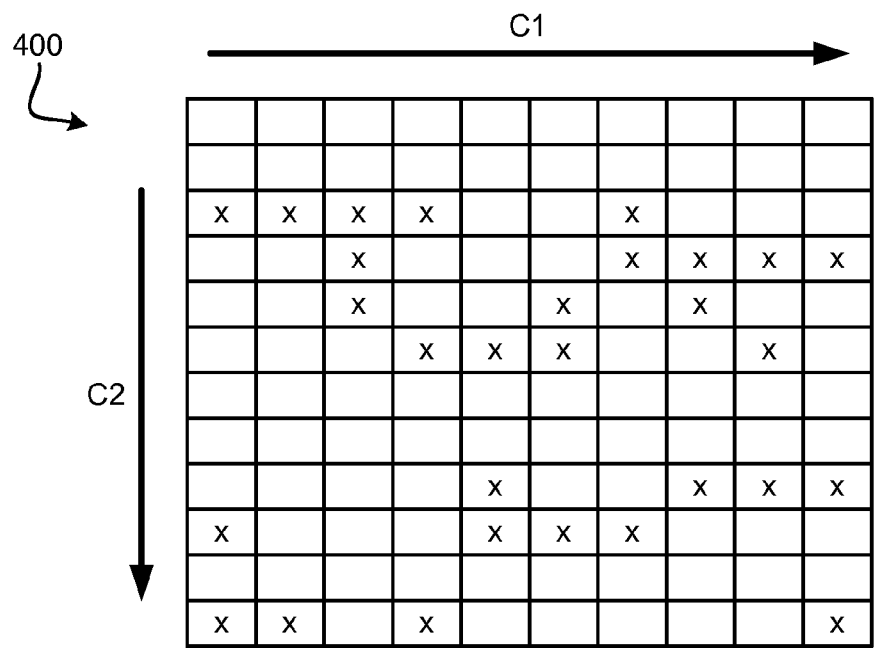
FIGS. 4A-4C show various exemplary sub data set arrays with errors therein.
Figure 4B:
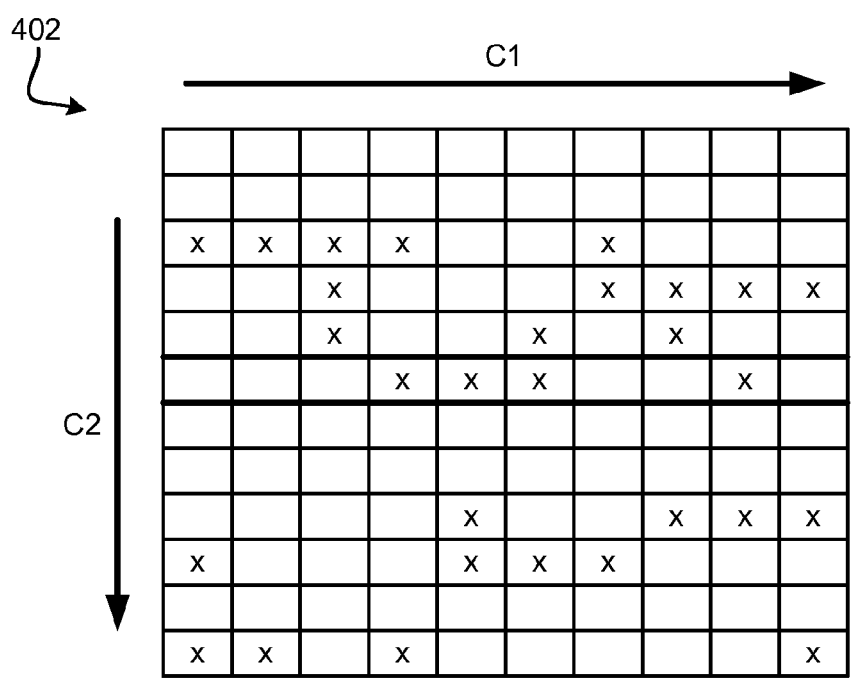
Figure 4C:
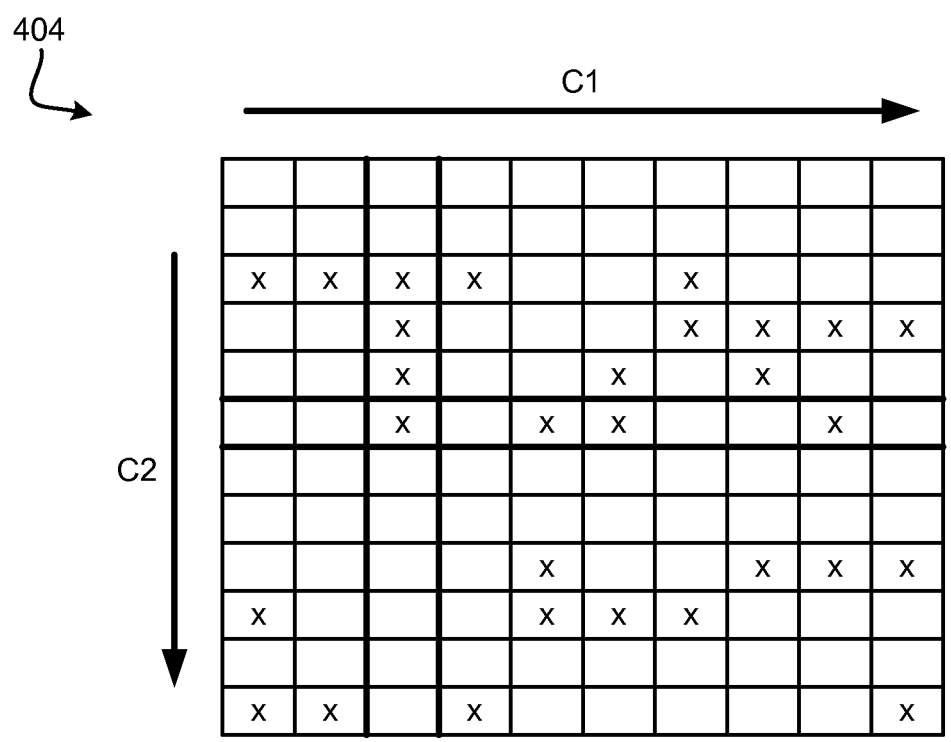

For example, with reference to FIGS. 4A-4C, exemplary data arrays are shown in order to describe issues associated with conventional reconstructive ERP. In each of these arrays, an "x" indicates an error byte within the C1 row. Furthermore, each of the highlighted rows indicate that the row includes C1 error. Each C1 error row has some bytes which do not include error (those without an "x") and some bytes which have error (those with an "x"). If it is assumed that C2 is able to correct error of three or less bytes in each column, then it can be determined whether the array is able to be corrected with C1 and C2 ECC.

As shown in FIG. 4A, the array 400 is able to be recovered by C2, because there are no columns that include more than three error bytes. On the other hand, if the highlighted rows are not copied at all because they are not C1 correctable on their own (as would be done in conventional reconstructive methods), then C2 cannot recover the error since all the rows, including the highlighted rows, are not available in the reserved data buffer with which to reconstruct the array.

To address this issue, a C1 row read from the magnetic tape (even when it includes C1 error) is always stored to the reserved data buffer when the stored C1 row in the reserved data buffer includes the same amount of C1 error as the read C1 row, or worse. To copy the C1 row from the magnetic tape to the reserved data buffer, the read C1 row is compared to the stored C1 row in the reserved data buffer.

For example, with reference to FIG. 4B, in data array 402, the 6th row has error at the 4th, 5th, 6th, and 9th bytes. Even though this row is uncorrectable with C1 error, C2 is able to correct the errors since each C2 column does not have more than three error bytes.

However, if the error positions are slightly different from those shown in FIGS. 4A and 4B, for example, as shown in array 404 in FIG. 4C, the 6th row has error at the 3rd, 5th, 6th, and 9th bytes, then C2 is not able to recover the error in the array, since the 3rd column has 4 bytes of error which is more than the maximum correctable number of error bytes using C2 as assumed in this example (3).

If the condition to copy a C1 row to the reserved data buffer is determined by the reliability of C1 error correction only (without including the C2 capabilities in the decision), it is not possible to determine which 5th row to copy to the array in FIGS. 4A-4C.

Furthermore, a DS actually includes a plurality of SDSs. Each SDS is a C1×C2 array. For example, there may be 64 SDSs in a given DS. ERP may be repeated until all SDSs are recovered with no error.

However, if storing of a C1 error row to the reserved data buffer is always allowed, when the stored C1 row in the reserved data buffer also has C1 error or worse, then this changes the contents of a SDS array after each reread (as long as at least one row is replaced) which might otherwise have been correctable using C2. In the case where a SDS array is correctable using C2, change of even one C1 error row may cause a C2-correctable SDS to become unexpectedly uncorrectable, an undesirable effect. As a result, the DS (and all SDSs thereof) may not be corrected.

To address this concern, non-error SDSs are copied to the reserved data buffer prior to performing the C1 error status check. The non-error SDS is copied to the reserved data buffer even though there are C1 rows in this SDS which have more C1 errors than may have been read from the magnetic tape in a subsequent read.

Figure 5:
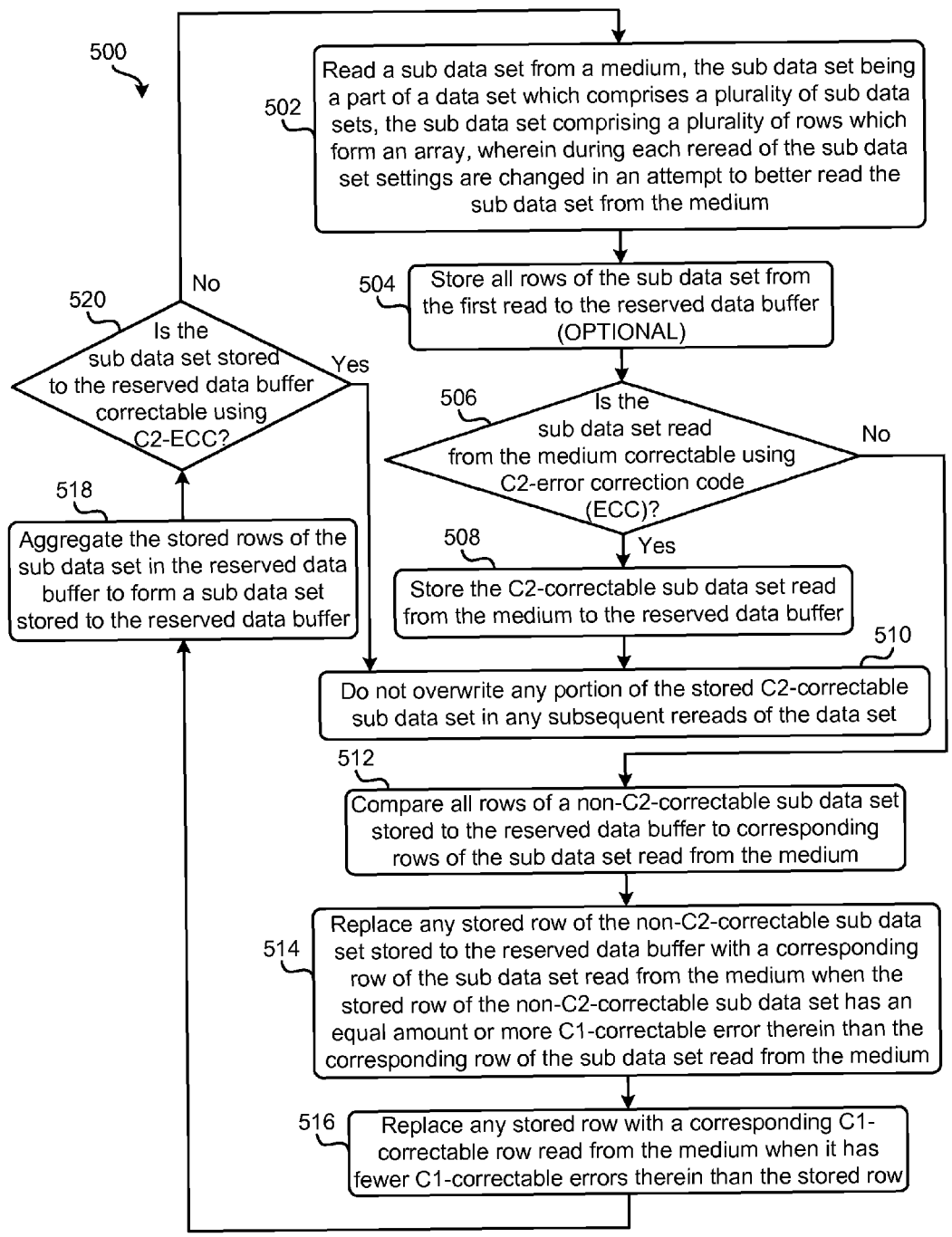
FIG. 5 shows a method for reading data from a medium using a reconstructive ERP, according to one embodiment.

Now referring to FIG. 5, a method 500 for reading data from a medium using reconstructive ERP is shown according to one embodiment. The method 500 may be performed in accordance with the present invention in any of the environments depicted in FIGS. 1-4C, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various non-limiting embodiments, the method 500 may be partially or entirely performed by a C1/C2 decoding system, a tape drive, a hard disk drive, an optical drive, a controller, a processor (such as a CPU, an ASIC, a FPGA, etc.) which may be embedded in and/or operate within a system, etc.

As shown in FIG. 5, method 500 may initiate with operation 502, where a sub data set (SDS) is read from a medium (one or more times, depending on the ability to read the sub data set). The sub data set is a part of a data set (DS) which comprises a plurality of sub data sets. Also, each sub data set comprises a plurality of rows which form a sub data set array (as described herein in more detail according to various embodiments).

In one embodiment, during each reread of the sub data set, reading settings are changed in an attempt to better read the sub data set from the medium. In a further embodiment, changing settings may include a change to at least one of: a medium speed during reading, a data flow correction power, channel parameters, and servo tracking, among other possibilities known in the art.

In one approach, the rows may be C1-encoded rows in the array representing the sub data set. Furthermore, each row of the array may comprise a header along with data encoded and interleaved into C1 codewords therein. In another embodiment, each portion may be a column in the array, in which the C1 steps are switched with C2 steps.

In other embodiments, a portion of the data set other than a sub data set may be read from the medium, and a plurality of these other portions may together form the data set. Each portion may be any part of the data set, and the data set may be represented by any structure. Furthermore, during each read of the data set, settings are changed in an attempt to better read the data set from the medium. By better read, what is meant is that fewer errors are encountered in the read data set by adjusting the settings used to read the data set from the medium.

The reserved data buffer may be part of a larger data buffer of a medium drive, such as a tape drive when the medium is a tape, or it may be a separate, dedicated memory for storage thereto, either in the drive or accessible to the drive used to read the data set.

In optional operation 504, all rows of the sub data set acquired via the first read from the medium may be stored to a reserved data buffer, and in this way, the sub data set may be stored to the reserved data buffer in its entirety, and rows thereof may be overwritten when they are at least as good or better rows reread from the medium than a row already stored to the reserved data buffer.

In operation 506, it is determined whether the sub data set read from the medium is correctable using C2-ECC (assuming that there are any errors present that require error correction). Furthermore, this C2-ECC check is performed prior to any C1-ECC check in this embodiment.

When the sub data set read from the medium is correctable using C2-ECC, this sub data set is in condition to be combined with all other sub data sets of the data set to be stored and/or output (such as via transmitting to a host). Therefore, in operation 508, the C2-correctable sub data set read from the medium is stored to the reserved data buffer.

Furthermore, in operation 510, it is ensured that no portion (e.g., rows and columns of the array, individual bytes of the array, etc.) of the stored C2-correctable sub data set is overwritten and/or altered in any subsequent rereads of the data set. Even though a row may be read from the medium which is better than a row stored for the sub data set, it may cause other problems described herein (such as no longer being C2-correctable), and therefore once the sub data set is C2-correctable, it is not modified further.

In operation 512, when the sub data set read from the medium is non-C2 correctable, all rows of a non-C2-correctable sub data set stored to the reserved data buffer are compared to corresponding rows of the sub data set read from the medium during a subsequent reading operation (in order for rows to be stored in the reserved data buffer, the sub data set must have been read from the medium at least once prior). The comparison attempts to determine whether the row read from the medium is at least as good (as determined by a number of C1-correctable errors included therein) as the corresponding row already stored to the reserved data buffer (but which was not able to be C2 corrected).

In operation 514, a stored row of the non-C2-correctable sub data set stored to the reserved data buffer is replaced with a corresponding row of the sub data set read from the medium when the stored row of the non-C2-correctable sub data set has an equal amount or more C1-correctable error therein than the corresponding row of the sub data set read from the medium. In this way, since the sub data set is not correctable using C2-ECC (or c1-ECC), as evidenced by the sub data set being non-C2-correctable, by replacing one or more rows therein, there is a chance that it may now be C2-correctable.

In operation 516, any C1-correctable rows read from the medium of a non-C2-correctable sub data set are stored to the reserved data buffer. In a further embodiment, a C1-correctable row read from the medium is not stored when the C1-correctable row read from the medium has more C1-correctable errors therein than a corresponding stored row of the non-C2-correctable sub data set stored to the reserved data buffer (if any C1-correctable rows are present in the reserved data buffer).

In one embodiment, when a row already exists in the reserved data buffer that matches a row read from the medium that has C1-correctable error therein, the stored row is overwritten when the corresponding row read from the medium has fewer C1-correctable or corrected errors therein than the stored row. For example, if a stored row has three corrected errors, and a read row only has two corrected errors, and both rows are C1-correctable and not part of a C2-correctable sub data set, the row read from the medium will overwrite the stored row in the reserved data buffer.

At some point during this method 500 (possibly between operation 516 and 518, but not necessarily so), the individual rows of the sub data set stored to the reserved data buffer are corrected, to the extent possible, using C1-ECC on the individual rows, thereby correcting as much error as possible for each row, according to one embodiment.

In operation 518, the stored rows of the sub data set are aggregated in the reserved data buffer to form a sub data set stored to the reserved data buffer. In this way, after some of the rows of the sub data set have been replaced with rows subsequently read from the medium and stored to the reserved data buffer, the entire sub data set may be assembled to form the sub data set stored to the reserved data buffer for subsequent operations thereon.

In operation 520, it is determined whether the sub data set stored to the reserved data buffer is correctable using C2-ECC (assuming that there are any errors present that require error correction). The first C2-ECC check was performed on the sub data set as it was read from the medium. In this check, the sub data set has had one or more rows therein replaced with rows read from the medium in a subsequent reading, thereby providing for the opportunity that any errors in the sub data set are now correctable. If the errors are correctable, then the sub data set is protected in operation 510 from changes, as described previously.

Otherwise, returning to operation 502, the sub data set is read from the medium again, with different settings, in an attempt to read the sub data set with less errors therein.

In a further embodiment, any remaining errors in the sub data set stored to the reserved data buffer are corrected using C2-ECC to form a reconstructed sub data set and the reconstructed sub data set may be output, sent to a host, stored, etc.

In one embodiment, the sub data set is reread from the medium and it is determined whether C2-ECC is capable of correcting all errors in the sub data set read from the medium prior to processing or the sub data set stored to the reserved data buffer after processing thereof until either a corrected sub data set is obtained, or a number of allowable retries is reached and the data set is reported as unreadable. In this way, using different settings, such as different hardware settings, portions which were not recoverable in a previous read may now be recoverable, and the entire data set may be assembled in the reserved data buffer.

According to one embodiment, the method 500 may be repeated until either a reconstructed data set is obtained, or a number of allowable retries is reached and the data set from which the sub data set is a part, is reported, such as to a host, as unreadable. The number of allowable retires may be a hardware setting of a drive, a predetermined number based on past attempts, a user setting, or a number derived through any other method known in the art.

In other words, the sub data set is reread from the medium, it is determined whether the sub data set is C2-correctable, existing portions in the reserved data buffer are overwritten with portions having fewer errors corrected therein, and it is determined again whether C2-ECC is capable of correcting all errors in the assembled sub data set until either a reconstructed sub data set is obtained, or a number of allowable retries is reached.

In one approach, the medium may be a magnetic tape, and the method 500 may be performed by a tape drive.

In a further embodiment, the method 500 may be executed by a system, the system comprising a data buffer comprising a reserved data buffer and logic integrated with and/or executable by a processor. The logic may be configured to read a sub data set from a medium, the sub data set being a part of a data set which comprises a plurality of sub data sets, the sub data set comprising a plurality of rows which form an array; store a C2-correctable sub data set read from the medium to the reserved data buffer when the sub data set read from the medium is correctable using C2-ECC; compare all rows of a non-C2-correctable sub data set stored to the reserved data buffer to corresponding rows of the sub data set read from the medium when the sub data set read from the medium is non-C2 correctable; replace any stored row of the non-C2-correctable sub data set stored to the reserved data buffer with a corresponding row of the sub data set read from the medium when the stored row of the non-C2-correctable sub data set has an equal amount or more C1-correctable error therein than the corresponding row of the sub data set read from the medium; replace any stored row of the non-C2-correctable sub data set stored to the reserved data buffer with a corresponding C1-correctable row read from the medium when it has fewer corrected errors therein than the stored row of the non-C2-correctable sub data set stored to the reserved data buffer; aggregate the stored rows of the data set in the reserved data buffer to form a sub data set stored to the reserved data buffer; determine whether C2-ECC is capable of correcting all errors in the sub data set stored to the reserved data buffer and ensuring that no portion of the C2-correctable sub data set stored to the reserved data buffer is overwritten during subsequent reading of the data set; and reread the sub data set from the medium using a different setting in an ERP when an error in the sub data set stored to the reserved data buffer is not correctable using C2-ECC.

Figure 6:
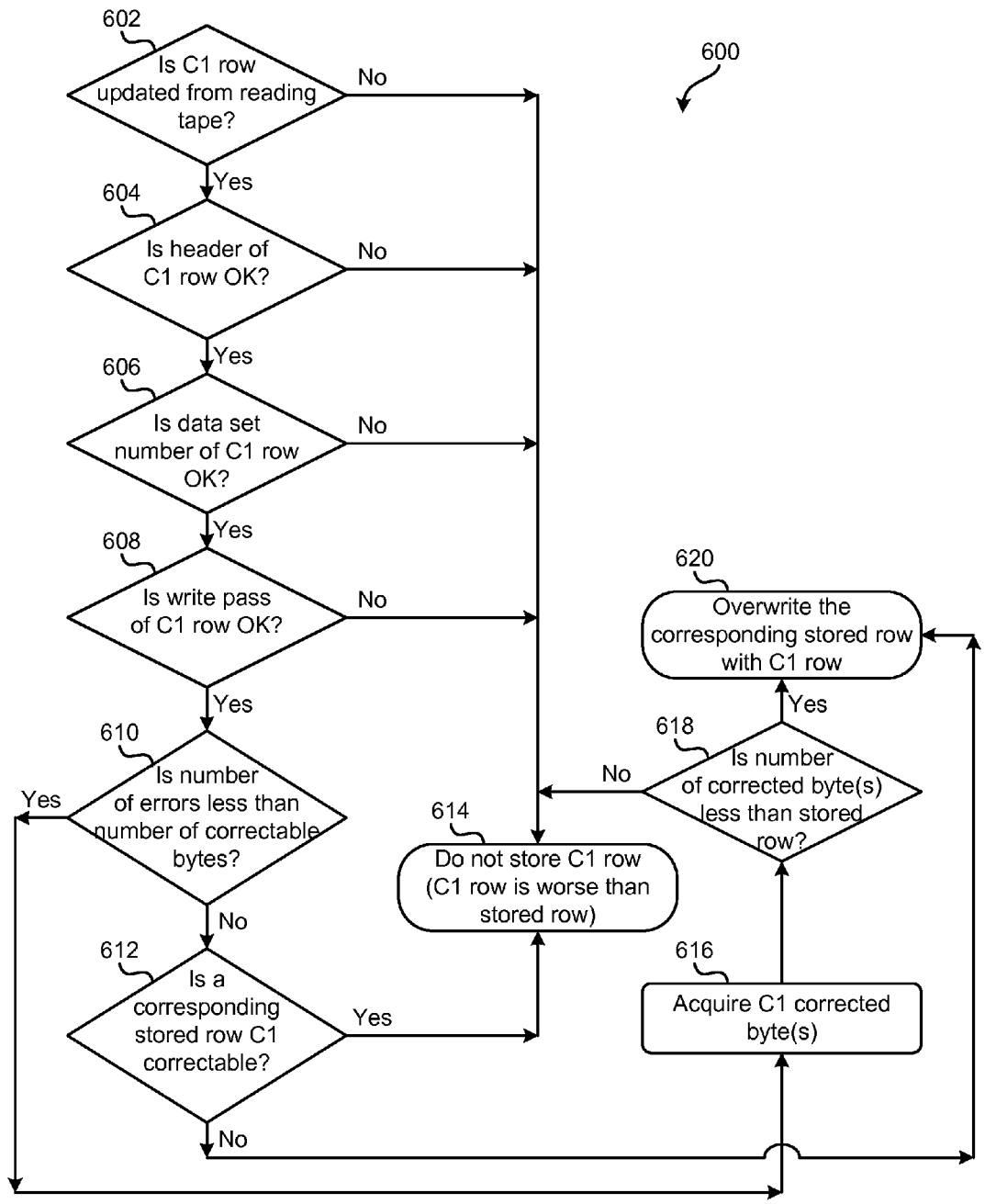
FIG. 6 shows a flowchart of a method, according to one embodiment.

Now referring to FIG. 6, a syndrome check is explained in more detail. When data is read from the medium, in the form of a data set or sub data set, each sub data set may be transferred to the drive buffer. Each row of each sub data set includes at least the following information: header information, write pass number, data set number, indicator for uncorrected or corrected status, and corrected bytes of C1-encoding. Using the above information, in one embodiment, the drive is capable of verifying that a currently read row is better than a previously stored row in the reserved data buffer. This process may be as shown in FIG. 6, or performed in any other way known in the art.

In FIG. 6, the method 600 begins with operation 602, where it is determined if the C1 row (the current row read from the sub data set for the remainder of the description of method 600) has been updated after reading the sub data set from tape. That is to say, during some sub data set reads, a particular row may not be readable, and if it is not, then method 600 ends at operation 614 because there is no row to compare.

In operation 604, it is determined if the header of the C1 row is acceptable. Each row has header information, and this header information helps to determine if the correct row is stored to the buffer. If not, the method ends at operation 614.

In operation 606, it is determined if the data set number is acceptable for the C1 row. The data set number is assigned from the beginning of the medium, such as 0 to N. The drive has knowledge of which data set is being manipulated in the buffer, and it is determined if the data set number of the C1 row is the same as that in the buffer. If not, the method ends at operation 614.

In operation 608, it is determined if the write pass of the C1 row is acceptable. Write pass is information which indicates the generation of the data set on the medium. If the data set number is the same, the data set which has a higher write pass is newer, making it the valid data set. Since the drive has knowledge of the write pass of the target data set, if the write pass number of the C1 row is less than the stored data set, the C1 row is discarded as being older and the method ends at operation 614.

In operation 610, it is determined if the number of errors in the C1 row is less than a maximum number of correctable errors, which is determined by the C1-encoding of the row in the sub data set. This is often referred to as a syndrome check. If the number of errors in the C1 row is not less than a maximum number of correctable errors, the method continues to operation 612; otherwise, the method continues to operation 616.

In operation 612, it is determined whether a corresponding stored row is C1-correctable. When the corresponding stored row is C1-correctable, method 600 ends at operation 614. This is often referred to as a syndrome check. If the corresponding stored row is not C1-correctable, the method continues to operation 620.

In operation 614, the C1 row is not stored to the buffer and the method 600 ends because the C1 row is worse than the row currently stored to the buffer.

In operation 616, the C1 corrected byte or bytes are acquired based on the C1-encoding to correct errors in the C1 row.

In operation 618, it is determined if the number of corrected byte(s) for the C1 row is less than the number of corrected byte(s) for the stored row. If so, the method 600 continues to method 620 where the C1 row is stored to the buffer (and possibly overwrites a current row in the buffer corresponding to the C1 row). If not, the method ends at operation 614.

Figure 7:
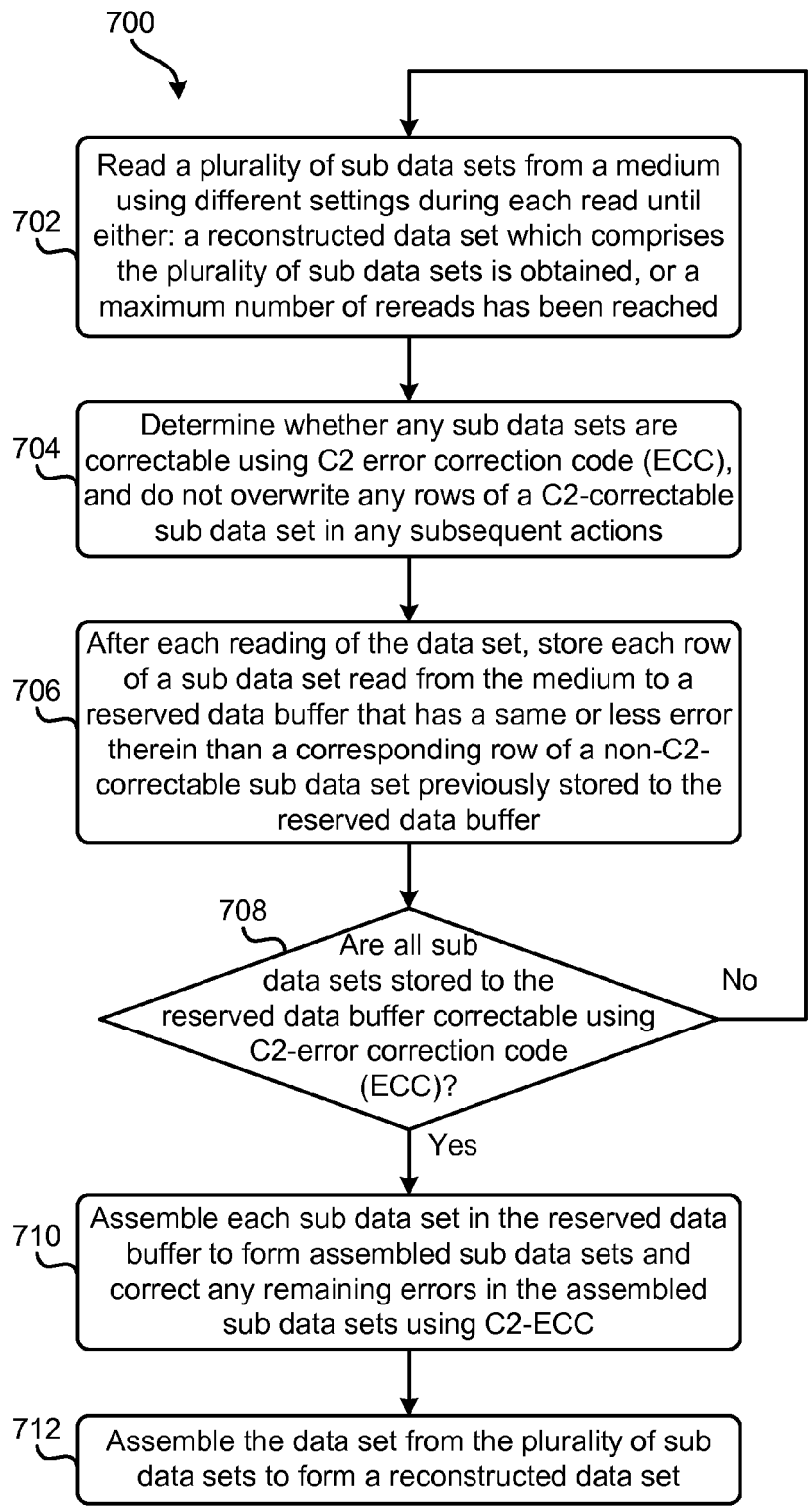
FIG. 7 shows a flowchart of a method for reading data from a medium using a reconstructive ERP, according to one embodiment.

With reference to FIG. 7, a method 700 for reading data from a medium using reconstructive ERP is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various non-limiting embodiments, the method 700 may be partially or entirely performed by a C1/C2 decoding system, a tape drive, a hard disk drive, an optical drive, a controller, a processor (such as a CPU, an ASIC, a FPGA, etc.) which may be embedded in and/or operate within a system, etc.

As shown in FIG. 7, method 700 may initiate with operation 702, where a plurality of sub data sets are read from a medium using different settings during each read until either: a reconstructed data set which comprises the plurality of sub data sets is obtained, or a maximum number of rereads has been reached. In one embodiment, the medium may be a magnetic tape.

In operation 704, it is determined whether any sub data sets are correctable using C2-ECC, and any rows of a C2-correctable sub data set are not overwritten in any subsequent actions. In this way, once a sub data set is C2-correctable, it is not modified in order to preserve this obtained sub data set.

In operation 706, after each reading of the data set, each row of a sub data set read from the medium is stored to a reserved data buffer that has a same or less error therein than a corresponding row of a non-C2-correctable sub data set previously stored to the reserved data buffer (if any is present in the reserved data buffer).

In operation 708, it is determined whether all sub data sets stored to the reserved data buffer are correctable using C2-ECC. When all sub data sets stored to the reserved data buffer are not correctable using C2-ECC, method 700 returns to operation 702 to reread at least the sub data set which is non-C2-correctable. Of course, more than just the non-C2-correctable sub data sets may be read from the tape, such as the entire data set.

In operation 710, each sub data set in the reserved data buffer is assembled from the rows stored therein to form assembled sub data sets. Of course, some of these rows may not be C1-correctable, but the sub data sets are assembled anyway in an attempt to correct any remaining errors using C2-ECC. Furthermore, any remaining errors in the assembled sub data sets are corrected using C2-ECC.

In operation 712, the data set is assembled from the plurality of sub data sets to form a reconstructed data set.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive, comprising:
    a reserved data buffer and logic integrated with and/or executable by a processor, the logic being configured to:
        read a portion of a data set from a medium, the portion of the data set comprising a plurality of rows which form an array;
        store the portion of the data set to the reserved data buffer in response to a determination that the portion of the data set is correctable using C2 error correction code (ECC);
        replace any stored row of a non-C2-correctable portion of the data set stored to the reserved data buffer with a corresponding row of a portion of the data set read from the medium in response to a determination that the stored row of the non-C2-correctable portion of the data set has an equal amount or more C1-correctable error therein than the corresponding row of the portion of the data set read from the medium; and
        replace any stored row of the non-C2-correctable portion of the data set stored to the reserved data buffer with a corresponding C1-correctable row read from the medium in response to a determination that the corresponding C1-correctable row read from the medium has fewer corrected errors therein than the stored row of the non-C2-correctable portion of the data set stored to the reserved data buffer.

2. The tape drive as recited in claim 1, wherein the logic is configured to compare all rows of the non-C2-correctable portion of the data set stored to the reserved data buffer to corresponding rows of the portion of the data set read from the medium in response to a determination that the rows of the portion of the data set read from the medium are non-C2 correctable prior to replacing rows of the non-C2-correctable portion of the data set stored to the reserved data buffer.

3. The tape drive as recited in claim 1, wherein the logic is configured to:
aggregate the stored rows of the non-C2-correctable portion of the data set stored to the reserved data buffer to form a portion of the data set stored to the reserved data buffer;
determine whether C2-ECC is capable of correcting all errors in the portion of the data set stored to the reserved data buffer and ensure that no C2-correctable portion of the data set stored to the reserved data buffer is overwritten during subsequent reading of the portion of the data set; and
reread the portion of the data set from the medium using a different setting in an error recovery procedure (ERP) in response to a determination that an error in the portion of the data set stored to the reserved data buffer is not correctable using C2-ECC.

4. The tape drive as recited in claim 3, wherein during each reread of the portion of the data set, settings are changed in an attempt to better read the portion of the data set from the medium.

5. The tape drive as recited in claim 4, wherein the logic configured to change settings comprises logic configured to change at least one setting selected from the group comprising: a medium speed during reading, a data flow correction power, channel parameters, and servo tracking.

6. The tape drive as recited in claim 1, wherein the medium is a magnetic tape.

7. The tape drive as recited in claim 1, wherein each row comprises a C1-encoded row in an array representing the portion of the data set.

8. The tape drive as recited in claim 1, wherein the logic is configured to store all of the portion of the data set to the reserved data buffer after a first reading of the portion of the data set from the medium.

9. A method for reading data from a medium, the method comprising:
reading a portion of a data set from a medium, the portion of the data set comprising a plurality of rows which form an array;
storing the portion of the data set to a reserved data buffer in response to a determination that the portion of the data set is correctable using C2 error correction code (ECC);
replacing any stored row of a non-C2-correctable portion of the data set stored to the reserved data buffer with a corresponding row of a portion of the data set read from the medium in response to a determination that the stored row of the non-C2-correctable portion of the data set has an equal amount or more C1-correctable error therein than the corresponding row of the portion of the data set read from the medium; and
replacing any stored row of the non-C2-correctable portion of the data set stored to the reserved data buffer with a corresponding C1-correctable row read from the medium in response to a determination that the corresponding C1-correctable row read from the medium has fewer corrected errors therein than the stored row of the non-C2-correctable portion of the data set stored to the reserved data buffer.

10. The method as recited in claim 9, comprising comparing all rows of the non-C2-correctable portion of the data set stored to the reserved data buffer to corresponding rows of the portion of the data set read from the medium in response to a determination that the rows of the portion of the data set read from the medium are non-C2 correctable prior to replacing rows of the non-C2-correctable portion of the data set stored to the reserved data buffer.

11. The method as recited in claim 9, comprising:
aggregating the stored rows of the non-C2-correctable portion of the data set stored to the reserved data buffer to form a portion of the data set stored to the reserved data buffer;
determining whether C2-ECC is capable of correcting all errors in the portion of the data set stored to the reserved data buffer and ensuring that no C2-correctable portion of the data set stored to the reserved data buffer is overwritten during subsequent reading of the portion of the data set; and
rereading the portion of the data set from the medium using a different setting in an error recovery procedure (ERP) in response to a determination that an error in the portion of the data set stored to the reserved data buffer is not correctable using C2-ECC.

12. The method as recited in claim 11, wherein during each reread of the portion of the data set, settings are changed in an attempt to better read the portion of the data set from the medium.

13. The method as recited in claim 12, wherein the settings that are changed are selected from the group comprising: a medium speed during reading, a data flow correction power, channel parameters, and servo tracking.

14. The method as recited in claim 9, comprising storing all of the portion of the data set to the reserved data buffer after a first reading of the portion of the data set from the medium.

15. The method as recited in claim 9, wherein each row comprises a C1-encoded row in an array representing the portion of the data set.

16. The method as recited in claim 9, wherein the portion of the data set is reread from the medium and it is determined whether C2-ECC is capable of correcting all errors in the portion of the data set read from the medium prior to processing or the portion of the data set stored to the reserved data buffer after processing thereof until either a corrected portion of the data set is obtained, or a number of allowable retries is reached and the portion of the data set is reported as unreadable.

17. The method as recited in claim 9, wherein the medium is a magnetic tape.

18. A tape drive, comprising:
a reserved data buffer and logic integrated with and/or executable by a processor, the logic being configured to:
read a data set from a medium;
store a first portion of the data set to the reserved data buffer in response to a determination that the first portion of the data set is correctable using C2 error correction code (ECC); and
replace any stored row of a non-C2-correctable portion of the data set stored to the reserved data buffer with a corresponding row of the data set read from the medium in response to a determination that the stored row of the non-C2-correctable portion of the data set has an equal amount or more C1- correctable error therein than the corresponding row of the data set read from the medium.

19. The tape drive as recited in claim 18, wherein the logic is configured to replace any stored row of the non-C2-correctable portion of the data set stored to the reserved data buffer with a corresponding C1-correctable row read from the medium in response to a determination that the corresponding C1-correctable row read from the medium has fewer corrected errors therein than the stored row of the non-C2-correctable portion of the data set stored to the reserved data buffer.

20. The tape drive as recited in claim 18, wherein the logic is configured to compare all rows of the non-C2-correctable portion of the data set stored to the reserved data buffer to corresponding rows of the data set read from the medium in response to a determination that the rows of the data set read from the medium are non-C2 correctable prior to replacing rows of the non-C2-correctable portion of the data set stored to the reserved data buffer.

\* \* \* \* \*